(No Model.) 2 Sheets—Sheet 1.

A. M. FITCH.
CARD GAME.

No. 393,969. Patented Dec. 4, 1888.

Witnesses:
T. R. Stuart,
Douglas Dyrenfurth.

Inventor:
Asa M. Fitch,
By Marble + Mason,
Att'ys.

(No Model.) 2 Sheets—Sheet 2.

A. M. FITCH.
CARD GAME.

No. 393,969. Patented Dec. 4, 1888.

Witnesses,
Tom R. Stuart
Douglas Dyrenfurth

Inventor:
Asa M. Fitch.
By Marble + Mason,
Attys.

UNITED STATES PATENT OFFICE.

ASA M. FITCH, OF SEYMOUR, INDIANA.

CARD-GAME.

SPECIFICATION forming part of Letters Patent No. 393,969, dated December 4, 1888.

Application filed January 19, 1888. Serial No. 261,320. (No model.)

*To all whom it may concern:*

Be it known that I, ASA M. FITCH, a citizen of the United States, residing at Seymour, in the county of Jackson and State of Indiana, have invented certain new and useful Improvements in Card-Games; and I do hereby declare the following to be a full, clear, and exact description of the invention, such as will enable others skilled in the art to which it appertains to make and use the same.

My invention relates to cards for use in playing interesting and instructive games, and is especially designed for the instruction of children in the rudimentary names and illustrations of objects in natural history, and has for its object to enable them to readily distinguish the difference in appearance of certain members of the animal and bird kingdoms from others, to instruct them in the correct spelling of the names, and in the classification of the several families of animals, birds, and reptiles, and to cultivate the memory and afford an amusing and pleasant pastime.

The improvement consists, essentially, in a series or pack of cards divided into suits or books, each book containing the pictures and names of a group of five animals or birds, and each card of a suit or book containing said five animals or birds arranged in different locations and having one distinctive animal or bird of the group represented on an enlarged scale at the top or upper end of said card which will represent one of the pictures that is not necessary to be called for or drawn in making up a book, as will hereinafter appear.

Figure 8:
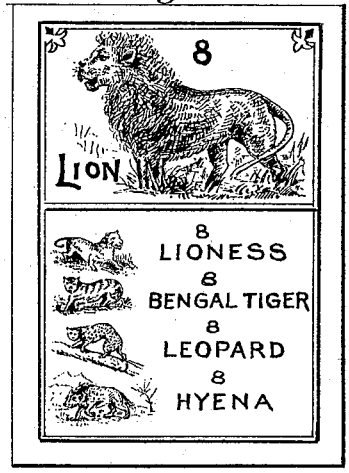
Figure 9:
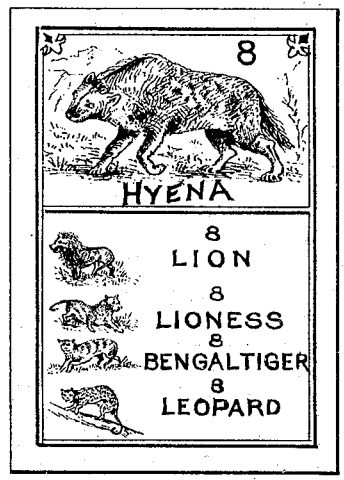

In the accompanying drawings are illustrated face views of a number of cards illustrative of my invention, one card of each suit of books being shown in the first seven figures and two cards of the eighth book being shown in Figures 8 and 9.

A full pack in the example which I shall hereinafter describe consists of forty cards divided or arranged in eight suits or books, each book consisting of five cards, and each card of a book containing a series of five names, numbers, and pictures representing animals and birds belonging to different families.

Figure 1:
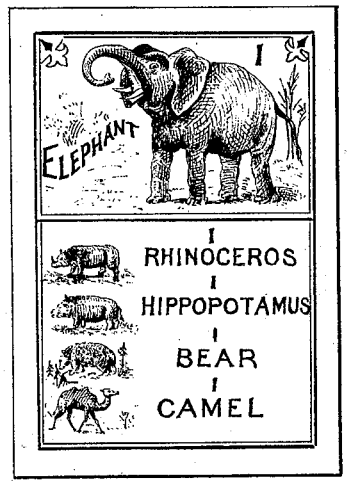

Book 1 is illustrated by Fig. 1, which represents a card upon which an elephant is shown on an enlarged scale in the upper portion of said card, and close to the animal is placed its name and the numeral 1, representing the suit or book to which it belongs. The lower portion of the card shown in this figure contains small pictures of the four remaining animals of the group composing the suit or book and the names rhinoceros, hippopotamus, bear, and camel placed opposite the corresponding animals.

Figure 2:
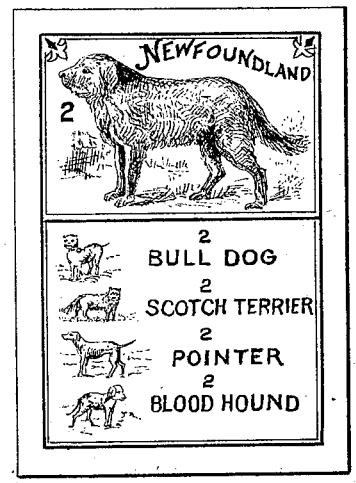

Book 2 is represented by Fig. 2, which shows a part of the dog family upon a card, the upper portion of said card showing an enlarged representation of a Newfoundland dog, the numeral 2 representing the number of the suit or book and the name of the animal placed near the picture thereof. The lower portion of this card contains the names of a bull-dog, Scotch terrier, pointer, and bloodhound, each placed opposite a small-sized picture representing the corresponding animal.

Figure 3:

Book 3 is represented by Fig. 3, which shows a card containing a group of birds, the representation at the top of the card showing an enlarged picture of an eagle, and near the same is the name of the bird and the numeral 3, indicating the number of the suit or book. On the lower portion of this card are placed pictures and names representing an owl, hawk, pheasant, and snipe.

Figure 4:
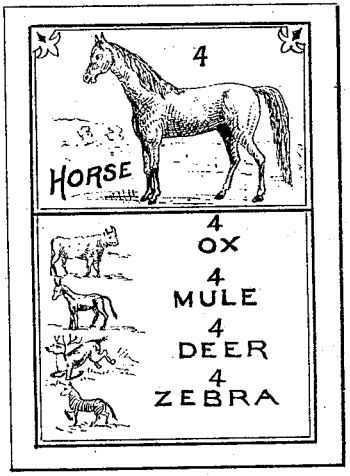

Book 4 is represented by Fig. 4, showing a card containing another group of animals, the large picture at the top of the card representing a horse, the name of the animal, and the numeral 4 being placed alongside of said picture. The lower portion of this card contains smaller pictures of an ox, a mule, deer, and zebra, and the names alongside of each animal.

Figure 5:
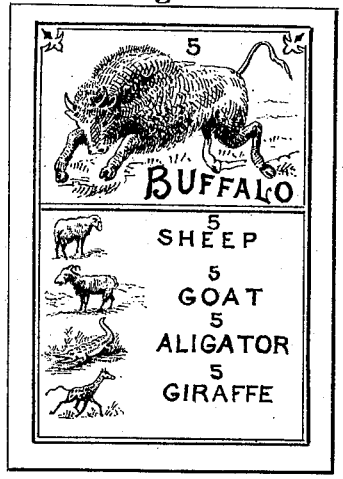

Book 5 is represented by Fig. 5, showing one of the cards belonging to that suit or book, the larger picture at the top of the card representing a buffalo, the number of the book 5, and the name of said animal being placed near its picture. Below are placed smaller pictures and the names designating each, of a sheep, goat, alligator, and giraffe.

Figure 6:
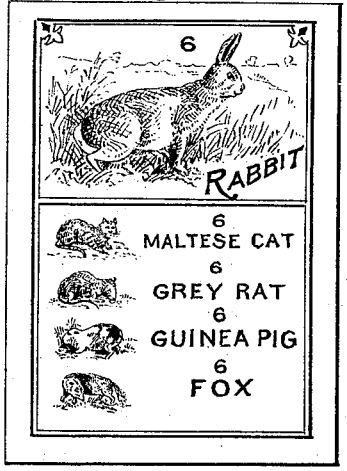

Book 6 is represented by Fig. 6, showing a card containing a large picture of a rabbet, the number of the book 6, and the name of the animal near it, and below the same are shown smaller pictures of a Maltese cat, gray rat, guinea pig, and fox; also, the corresponding name is placed alongside of each animal.

Figure 7:
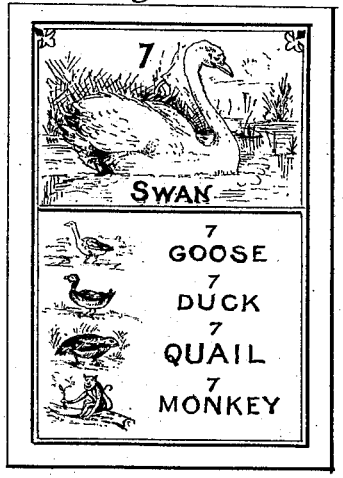

Book 7 is represented by Fig. 7, showing a card containing a large picture of a swan swimming in a pond on its upper portion, the number 7 representing the suit of book, and the name of the bird placed under its picture, and upon the lower portion of said card are represented smaller pictures and the names of a goose, duck, quail, and monkey.

Book 8 is represented by the two cards shown in Figs. 8 and 9, Fig. 8 showing on its upper end an enlarged picture of a lion, the name thereof, and the number 8, representing the suit or book, and on the lower end thereof smaller pictures and names of a lioness, tiger, leopard, and hyena, and Fig. 9 representing an enlarged picture of a hyena, the name thereof, and the number 8 at the top of the card, and smaller pictures and the corresponding names of a lion, lioness, Bengal tiger, and leopard, in the order named, at the lower end of the card.

The cards represented in Figs. 8 and 9 both belong to the same suit or book, and each has pictures of the same animals differently arranged, each card also representing a distinctive animal at the top by a picture larger than the rest of the animals on the same card. It will be observed that this book 8, as shown in Figs. 8 and 9, like all the other books representing animals, comprises five animals—the lion, hyena, leopard, lioness, and Bengal tiger. As the two cards of this book show the lion and hyena at their upper ends in enlarged pictures, it is to be understood that the remaining three cards of this book will represent enlarged views of the leopard, lioness, and Bengal tiger at their upper ends, and that the smaller pictures on the lower portions of said cards will be differently arranged after the manner represented in said figures. It will also be observed that the smaller pictures of the animals and birds are fac-simile representations on a smaller scale of the larger pictures at the top of each card of the suit or book, and thus that the cards in each suit or book may be easily identified by said pictures.

In playing the game, one of the party will mix or "shuffle" the cards thoroughly, and, commencing on the left, give each player one card all around until each one has five cards. The player on the left of the dealer can call from any one any card that will help to make a book, and if successful the same player can call again. If not successful, said player must draw a card from the top of the pack. If the card called for be drawn, the player can call again. If not drawn, the next player continues the game in the same manner, and each player in turn follows or plays in regular order until all of the suits or books have been collected. The player who gets the most books wins the game. No person shall call for any card unless he have one card of the book called for already in his hand. The card called for must have a large picture at the top, and the player must call by the small pictures, names, or numbers on the card or cards in hand having the larger picture or pictures. For instance, if a player have in his hand the two cards shown in Figs. 8 and 9, with the large pictures of the lion and hyena at their upper ends, it is to be understood that it is only necessary for said player to call or draw for the three other animals by name, picture, or number of the book—the lioness, Bengal tiger, and leopard—in order to make up or complete that particular suit or book, and the same rule prevails whether the player holds one or more of the five cards constituting a suit or book.

It will be seen from the foregoing that each card contains all the numbers, names, and pictures necessary to compose a full suit or book, and that five cards of each class make up a complete book.

I do not limit my invention, however, to the number of cards in a book, nor to the number of books for playing the game, so long as the principle or manner of playing the game is observed; also, the rules described for playing the game may be varied, as they do not constitute the essential features of my invention.

This game enables children to play who cannot read, thus familiarizing them with the forms and names of animals and birds, and at the same time amusing them; also, it is amusing to older persons.

Having thus described my new game of cards and the manner of playing the same, what I claim as my invention is—

1. A pack of game-cards made up in suits or books, each book containing the pictures of a group of animals or birds, and each card of each book having the pictures of all the animals or birds in that group, substantially as described.

2. A pack of game-cards made up in suits or books, each book containing the pictures of a group of animals or birds, and each card of each suit or book having the pictures of all the animals or birds in that group, and also one distinctive animal or bird of the group designated upon an enlarged scale, substantially as described.

3. A pack of game-cards made up in suits or books, each book containing the pictures of a group of animals or birds, and each card of each book having the pictures of all the animals or birds in the group, one distinctive animal or bird of the group designated upon an enlarged scale, and the names of said animals or birds placed near their corresponding pictures, substantially as described.

4. A pack of game-cards made up in suits or books of the same number of cards, each card containing the pictures of a group of animals or birds, which form the suit or book, one of said pictures being designed on an enlarged scale and the remaining pictures being fac-simile representations on a smaller scale of the larger pictures on the other cards in said suit or book, each picture having the corresponding name of the animal or bird placed adjacent thereto and the number of the suit or book to which it belongs, substantially as described.

In testimony whereof I affix my signature in presence of two witnesses.

ASA M. FITCH.

Witnesses:
O. H. MONTGOMERY,
SAMUEL P. HARRIS.